(12) United States Patent
Hada et al.

(10) Patent No.: US 7,831,743 B2
(45) Date of Patent: Nov. 9, 2010

(54) NUMERICAL CONTROLLER MANAGING MULTIPLE INPUT/OUTPUT UNITS THAT AUTOMATICALLY ALLOCATE AND STORES GROUP IDS FOR THE INPUT/OUTPUT UNITS

(75) Inventors: Kouji Hada, Yamanashi (JP); Hiroshige Ando, Yamanashi (JP); Hiroshi Noda, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 148 days.

(21) Appl. No.: 12/068,284

(22) Filed: Feb. 5, 2008

(65) Prior Publication Data

US 2008/0189445 A1 Aug. 7, 2008

(30) Foreign Application Priority Data

Feb. 6, 2007 (JP) ............................. 2007-026954

(51) Int. Cl.
*G06F 3/00* (2006.01)
(52) U.S. Cl. .............................. 710/15; 710/16; 710/17; 710/18; 710/19; 709/200; 709/220; 709/245; 370/305
(58) Field of Classification Search ............. 710/15–19; 709/200–220, 245; 370/305
See application file for complete search history.

(56) References Cited

U.S. PATENT DOCUMENTS

| | | | |
|---|---|---|---|
| 5,495,575 A * | 2/1996 | Hermann et al. ............ 709/222 |
| 5,615,106 A | 3/1997 | Yoshino et al. | |
| 5,822,615 A | 10/1998 | Yamashita et al. | |
| 5,914,957 A * | 6/1999 | Dean et al. ................... 370/438 |
| 6,041,348 A * | 3/2000 | Smith ........................ 709/220 |
| 6,670,882 B1 * | 12/2003 | Bachar ........................ 340/3.5 |
| 6,738,920 B1 * | 5/2004 | Horne ......................... 713/500 |
| 6,775,726 B2 * | 8/2004 | Chong ......................... 710/104 |
| 7,139,839 B2 * | 11/2006 | White et al. ................. 709/245 |
| 2006/0198239 A1 * | 9/2006 | Zehentner .................... 365/241 |
| 2006/0268854 A1 | 11/2006 | Lee | |
| 2007/0234071 A1 * | 10/2007 | Pyeon ......................... 713/190 |
| 2008/0069151 A1 * | 3/2008 | Satoh et al. .................. 370/503 |

FOREIGN PATENT DOCUMENTS

| | | |
|---|---|---|
| EP | 0 692 753 | 1/1996 |
| JP | 3297249 | 4/2002 |

* cited by examiner

*Primary Examiner*—Tammara Peyton
(74) *Attorney, Agent, or Firm*—Drinker Biddle & Reath LLP

(57) ABSTRACT

A numerical controller in which group IDs are automatically allocated to I/O units so that the group IDs and addresses can be set automatically even when a system configuration is changed in response to detection of a configuration error. When a power of the numerical controller is turned on, group IDs are successively allocated to I/O units with distance from the numerical controller, and types of the I/O units are stored. Initial values of the group IDs allocated when the power is turned on for the first time after a system of the numerical controller is constructed, and addresses for the allocated group IDs are stored. An alarm is issued if the types and number of units for the group IDs automatically allocated for the second or later time of starting the numerical controller are different from the initial values.

5 Claims, 7 Drawing Sheets

| Grp ID | UNIT TYPE |
|--------|-----------|
| 1 | A |
| 2 | B |
| 3 | B |
| 4 | C |
| 5 | D |

FIG. 5
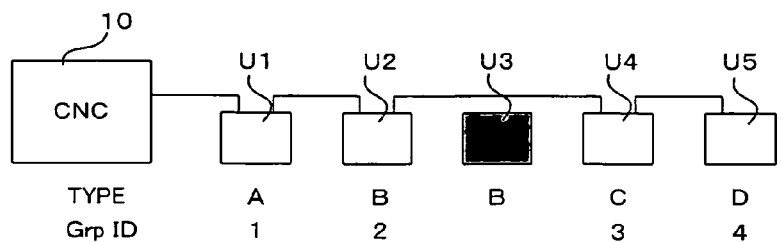
FIG. 6
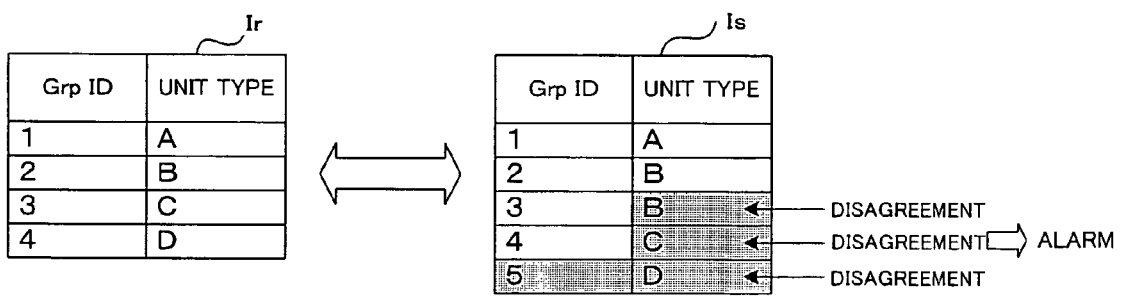
FIG. 7

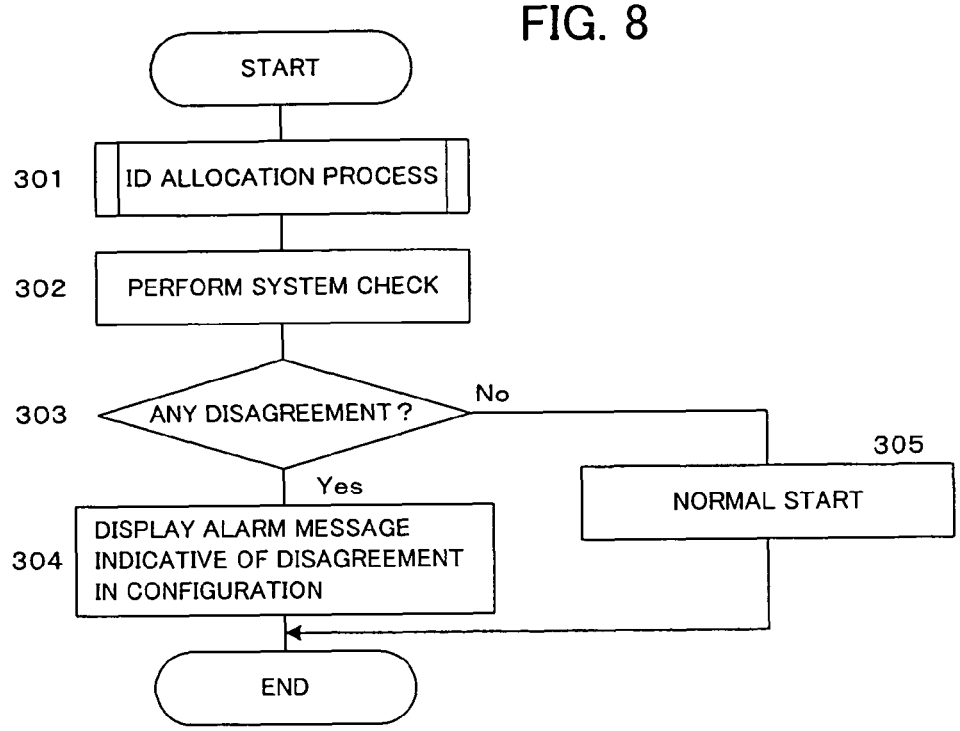
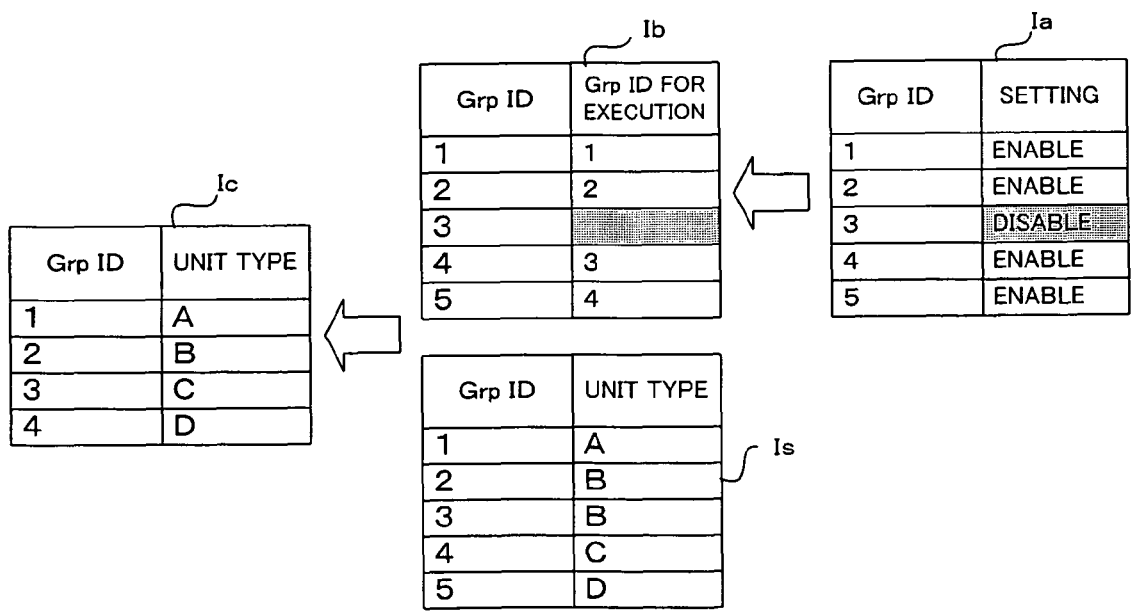

FIG.10a
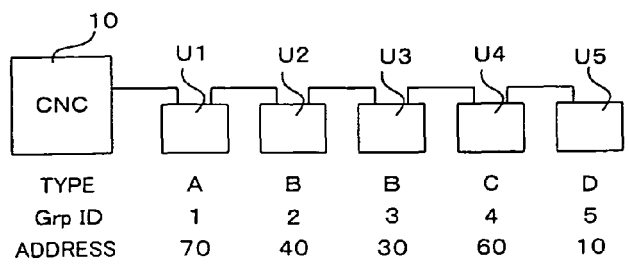
FIG.10b
| ALLOCATION DATA | | ACTUAL I/O UNIT |
|---|---|---|
| ADDRESS IN CNC DATA | Grp ID | |
| 10 | 5 | U5 |
| 20 | | |
| 30 | 3 | U3 |
| 40 | 2 | U2 |
| 50 | | |
| 60 | 4 | U4 |
| 70 | 1 | U1 |
| 80 | | |
FIG.11a
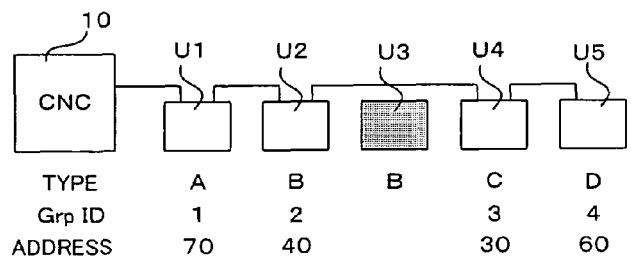
FIG.11b
| ALLOCATION DATA | | ACTUAL I/O UNIT |
|---|---|---|
| ADDRESS IN CNC DATA | Grp ID | |
| 10 | 5 | |
| 20 | | |
| 30 | 3 | U4 |
| 40 | 2 | U2 |
| 50 | | |
| 60 | 4 | U5 |
| 70 | 1 | U1 |
| 80 | | |

| TYPE | A | B | B | C | D |
|---|---|---|---|---|---|
| Grp ID | 1 | 2 | | 3 | 4 |
| ADDRESS | 70 | 40 | | 60 | 10 |

| ALLOCATION DATA | | ACTUAL I/O UNIT |
|---|---|---|
| ADDRESS IN CNC DATA | Grp ID | |
| 10 | 4 | U5 |
| 20 | | |
| 30 | | |
| 40 | 2 | U2 |
| 50 | | |
| 60 | 3 | U4 |
| 70 | 1 | U1 |
| 80 | | |

IAs

| ALLOCATION DATA | | CONVERTED Grp ID ACCORDING TO TABLE Ib | ACTUAL I/O UNIT |
|---|---|---|---|
| ADDRESS | Grp ID | | |
| 10 | 5 | 5 | U5 |
| 20 | | | |
| 30 | 3 | 3 | U3 |
| 40 | 2 | 2 | U2 |
| 50 | | | |
| 60 | 4 | 4 | U4 |
| 70 | 1 | 1 | U1 |
| 80 | | | |

MODIFICATION OF TABLE Ib BY DISABLING Grp ID "3"

IAr

| ALLOCATION DATA | | CONVERTED Grp ID ACCORDING TO TABLE Ib | ACTUAL I/O UNIT |
|---|---|---|---|
| ADDRESS | Grp ID | | |
| 10 | 5 | 4 | U5 |
| 20 | | | |
| 30 | 3 | | |
| 40 | 2 | 2 | U2 |
| 50 | | | |
| 60 | 4 | 3 | U4 |
| 70 | 1 | 1 | U1 |
| 80 | | | |

NUMERICAL CONTROLLER MANAGING MULTIPLE INPUT/OUTPUT UNITS THAT AUTOMATICALLY ALLOCATE AND STORES GROUP IDS FOR THE INPUT/OUTPUT UNITS

BACKGROUND OF THE INVENTION

1. Field of the Invention

The present invention relates to a numerical controller, and more particularly to connection between a numerical controller and external signal input/output units.

2. Description of the Related Art

In an arrangement such that a plurality of external signal input/output units are connected to a numerical controller in order to input and output I/O signals (input/output signals) between a numerical controller and a machine tool, external signals (I/O) to be inputted and outputted vary depending on the configuration of a system. In inputting the I/O signals, it is necessary to freely allocate addresses in the numerical controller to the I/O signals.

In general, IDs (group IDs) for identification are set in units for external signals by means of switches on the units, the units are identified by the group IDs set by the switches (see JP 3297249B), and addresses are allocated to I/O signals based on the set group Ids.

According to the conventional method in which the group IDs for unit identification are set by means of the switches on the external signal input/output units, the IDs must necessarily be set with the switches on the individual input/output units at the time of connection between the numerical controller and the units and their maintenance. Thus, there is a possibility of setting errors. Since indispensable switching components are increased in number, moreover, the manufacture requires more inspection items, thereby entailing an increase in costs.

On the other hand, there is a possible method in which IDs are automatically allocated by software. According to this method, however, a wrong configuration cannot be detected at the time of system change, and an operation may possibly be performed with wrong allocation. Also in the case where the system configuration is temporarily changed at the time of maintenance, for example, the allocation of the addresses must inevitably be set again.

SUMMARY OF THE INVENTION

The present invention provides a numerical controller capable of automatically allocating group IDs to external signal input/output units so that an error in system configuration is detected and the group IDs are easily set to the external signal input/output units even when the system configuration is changed.

A numerical controller of the present invention has a plurality of external-signal input/output units connected thereto. According to an aspect of the present invention, the numerical controller comprises: group ID allocating means that automatically allocates group IDs to the external-signal input/output units each time when the numerical controller is started; initial system-configuration information storage means storing initial system-configuration information indicative of correspondence between the group IDs and the external-signal input/output units and; checking means that checks whether or not correspondence between group IDs automatically allocated by the group ID allocating means when the numerical controller is started and the external-signal input/output units agrees with the correspondence of the initial system-configuration information stored in the initial system-configuration information storage means; and means that issues an alarm when a result of the check by the checking means is negative.

The numerical controller may further comprise reading means that reads types of the external-signal input/output units respectively therefrom each time when the numerical controller is started, wherein the initial system-configuration information storage means may store correspondence between the group IDs and types of the external-signal input/output units, and the checking means may check whether or not correspondence between group IDs automatically allocated by the group ID allocating means and the types of the external-signal input/output units read by the reading means when the numerical controller is started agrees with the correspondence stored by the initial system-configuration information storage means.

A numerical controller of the present invention has a plurality of external-signal input/output units connected thereto and a signal memory for input/output signals of the external-signal input/output units. According to another aspect of the invention, the numerical controller comprises: group ID allocating means that automatically allocates group IDs to the external-signal input/output units each time when the numerical controller is started; initial system-configuration information storage means that stores initial system-configuration information indicative of correspondence between the group IDs and the external-signal input/output units; initial address-correspondence information storage means that stores correspondence between the group IDs of the initial system-configuration information and addresses of the signal memory; enable/disable setting means that sets enable/disable states for the group IDs of the initial system-configuration information; means that creates group ID correspondence information indicative of correspondence between the group IDs of the initial system-configuration information and group IDs modified according to the enable/disable states set by the enable/disable setting means; and means that obtains modified address-correspondence information indicative of correspondence between the modified group IDs and addresses of the signal memory based on the initial address-correspondence information and the group ID correspondence information, wherein the input/output signals of the external-signal input/output units are controlled according to the modified address-correspondence information.

In this aspect, the numerical controller may further comprise means that obtains system-configuration checking information based on the group ID correspondence information and the correspondence between the group IDs and the external-signal input/output units of the initial system-configuration information, checking means that checks whether or not the correspondence between group IDs automatically allocated by the group ID allocation means when the numerical controller is started and the external-signal input/output units agrees with the system-configuration checking information, and means that issues an alarm when a result of the check by the checking means is negative.

The numerical controller may further comprise reading means that reads types of the external-signal input/output units respectively therefrom each time when the numerical controller is started, wherein the initial system-configuration information storage means may store correspondence between the group IDs and types of the external-signal input/output units, and the checking means may check whether or not correspondence between group IDs automatically allocated by the group ID allocation means when the numerical controller is started and the types of the external-signal input/output units read by the reading means agrees with the system-configuration checking information obtained based on the group ID correspondence information and the correspondence between the group IDs and types of the external-signal input/output units stored by the initial system-configuration information storage means.

According to the present invention, an alarm is issued when the power is turned on if the configuration of a system in the numerical controller to which the plurality of external signal input/output units are connected is different from an original one owing to misconnection, failure, etc. Thus, detection of an abnormality is so easy that a malfunction can be prevented. In purposely changing the system configuration, moreover, the group IDs that agree with the modified system and the addresses of the input/output signals of the external signal input/output units in the memory in the numerical controller can be automatically set by only setting the enable/disable states for the group IDs corresponding to the external signal input/output units, whereby the system can be reconstructed with ease.

BRIEF DESCRIPTION OF THE DRAWINGS

FIG. 5 is a diagram showing an example in which one of I/O units is not connected;

FIG. 6 is a diagram illustrating system configuration information for the storage of relationships between the I/O unit types and group IDs obtained in the system configuration example shown in FIG. 5;

FIG. 7 is a diagram illustrating an outline of a system check;

FIG. 8 is a flowchart showing an algorithm of a system check process according to a first embodiment of the invention;

FIG. 9 is a diagram illustrating the way of obtaining checking system configuration information based on enable/disable setting for initial values of group Ids according to a second embodiment of the invention;

FIGS. 10a and 10b are diagrams illustrating a state for system construction according to the second embodiment;

FIGS. 11a and 11b are diagrams illustrating a state before I/O units and addresses are made conformable to one another when one of the I/O units is not connected;

FIG. 13 is a diagram illustrating an example in which the correspondence between the I/O units and the addresses are changed as a system according to the second embodiment is changed.

DETAILED DESCRIPTION

In some cases, a computerized numerical controller (CNC) may be configured so that a plurality of external signal input/output units (hereinafter referred to as I/O units) are connected as means for inputting and outputting input/output signals (hereinafter referred to as I/O signals) between various relays, sensors, etc. on the side of a machine tool. The numerical controller and each I/O unit are connected to each other by, for example, a serial communication cable.

Figure 1:
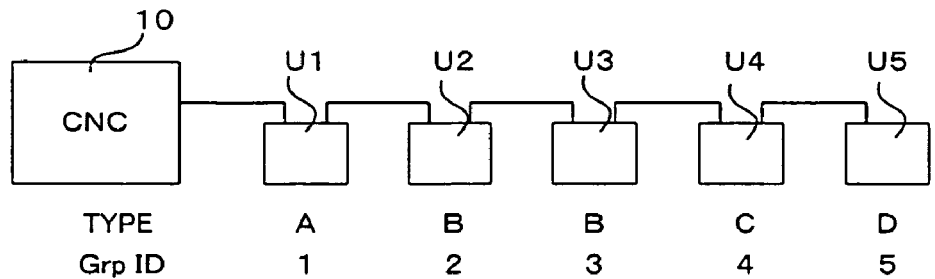
FIG. 1 is a diagram showing an outline of one embodiment of the present invention.

FIG. 1 is a schematic diagram showing one embodiment of the present invention in which a numerical controller 10 and a plurality of I/O units U1, U2, U3, ... are connected by serial communication cables. This example is a separately-installed type in which the I/O units U1, U2, U3, ... are externally attached to the numerical controller 10. Also in the case of a built-in type in which the I/O units U1, U2, U3, ... are arranged inside the numerical controller 10, they are connected by serial communication paths. Thus, the installation type may be either the external attachment type or the built-in type.

In the description to follow, "Grp ID" used in each drawing represents a group ID, while 1, 2 and 3 that are described corresponding to the Grp ID designate group IDs. The group IDs are allocated individually to the I/O units in accordance with predetermined regulations. In this embodiment, the group IDs are composed of numbers for allocation that become larger with distance from the numerical controller (CNC).

Further, A, B, C, ... individually represent informations indicative of the types of the I/O units, including "A for I/O units with 32 inputs and 24 outputs and B for analog-input I/O units", which are classified by the number and functions of signals.

Figure 2:
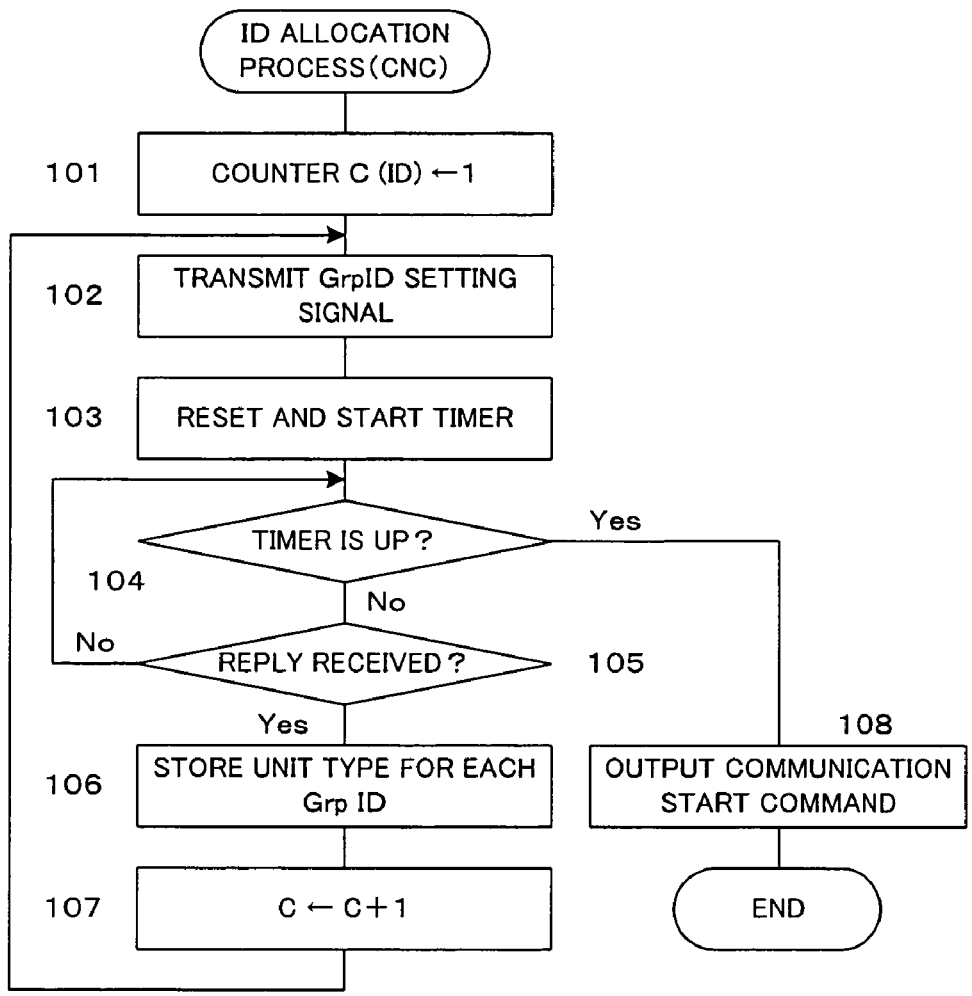
FIG. 2 is a flowchart showing an algorithm of a group ID allocation process according to the embodiment.
Figures 3, 4:
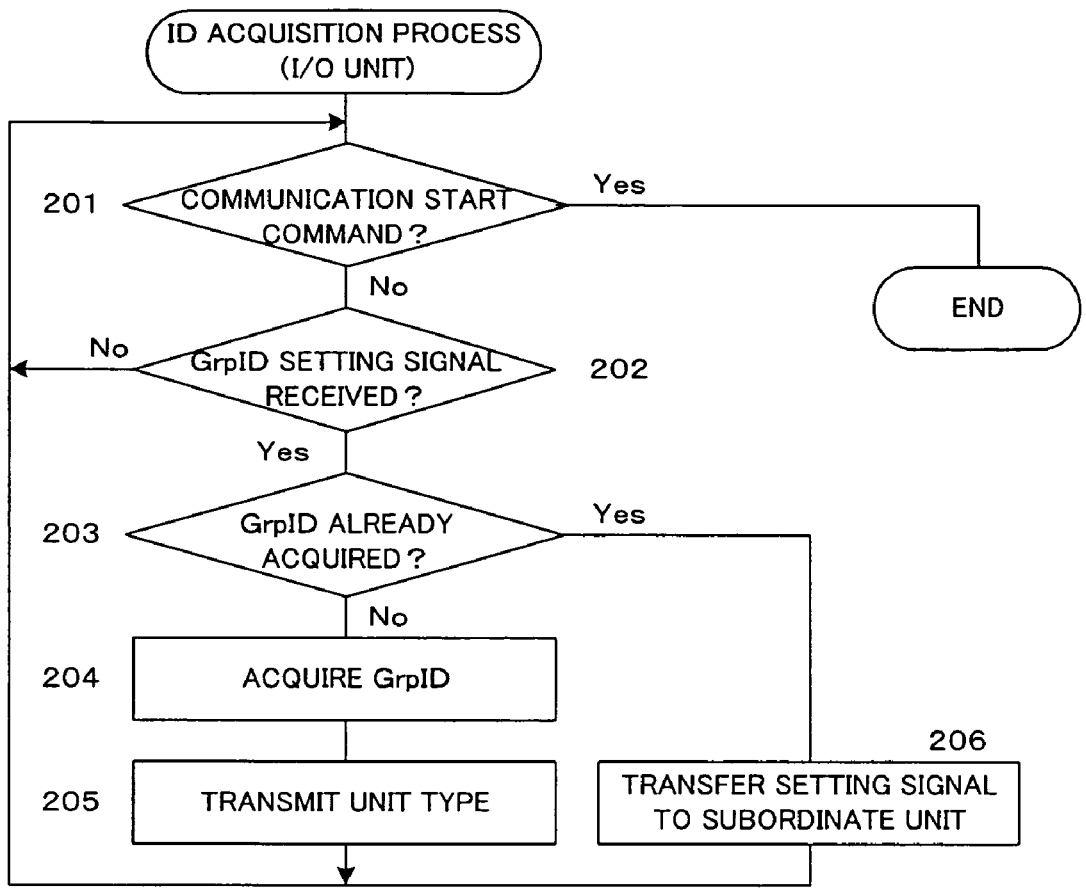
FIG. 3 is a flowchart showing an algorithm of a group ID acquisition process executed by each I/O unit according to the embodiment.
FIG. 4 is a diagram illustrating system configuration information for the storage of relationships between group IDs and I/O unit types according to the embodiment.

When the power of the numerical controller 10 is turned on, in this arrangement, the controller 10 executes a group ID allocation process. In response to this, the I/O units U1, U2, U3, ... execute a group ID acquisition process. FIG. 2 is a flowchart showing an algorithm of the group ID allocation process performed by a processor of the numerical controller 10. FIG. 3 is a flowchart showing an algorithm of the group ID acquisition process executed by each I/O unit.

When the power of the numerical controller 10 is turned on, the processor of the controller 10 first sets a counter C (ID) which indicates the group ID to "1" (Step 101), and transmits a setting signal for the value of the counter C (ID) as the group ID to the I/O unit side (Step 102). Then, the processor resets and starts a timer (Step 103) and determines whether or not the timer is up (Step 104) and whether or not the I/O unit type is received together with a receipt signal from the I/O unit U1, U2, U3, ... (Step 105). If the I/O unit type (A, B, C, ... ) from the I/O unit is received, the received I/O unit type is stored to be associated with the group ID given by the counter C (ID) (Step 106), and 1 is added to the counter C (ID) (Step 107), whereupon the procedure returns to Step 102. Thereafter, the aforesaid processing of Steps 102 to 107 is executed repeatedly. If it is determined in Step 104 that the timer is up without any returns from the I/O units U1, U2, U3, ..., it is concluded that the group ID acquisition process is finished, and a communication start command is output to each I/O unit (Step 108). Thereupon, this group ID acquisition process is terminated.

On the other hand, each of the I/O units U1, U2, U3, ... starts the process shown in FIG. 3 after the power is turned on, and determines whether or not the communication start command is sent and whether or not the group ID setting signal is sent (Steps 201 and 202). If the group ID setting signal is received, it is determined whether or not the group ID is already acquired (Step 203). If the group ID is not acquired, each I/O unit acquires the received group ID as its own group ID (Step 204) and transmits its I/O unit type (A, B, C, ... ) together with a receipt signal to the numerical controller 10 (Step 205), whereupon the procedure returns to Step 201. If the group ID is already acquired, on the other hand, the procedure proceeds from Step 203 to Step 206 where the group ID setting signal is transferred to the subordinate I/O unit, and the procedure returns to Step 201.

If the communication start command is received (Step 201), moreover, this group ID acquisition process is finished, and an input/output process for a normal I/O signal is started.

In each of the I/O units U1, U2, U3, . . . , means for acquiring the group ID is supposed to be stored into storage means (RAM) whose memory is lost when the power is turned off. When the power of the I/O unit is turned off, the group ID having so far being stored disappears. Each of the I/O units U1, U2, U3, . . . is provided with a processor, which may be used to execute the process shown in FIG. 3. If no processor is provided, the process shown in FIG. 3 is executed by the use of a dedicated circuit.

The processes shown in FIGS. 2 and 3 are executed every time the power of the numerical controller 10 is turned on. The group IDs are fed in the order of 1, 2, 3, . . . , and the I/O units U1, U2, U3, . . . acquire the group IDs, advancing with distance from the numerical controller 10. Thus, the group IDs are attached individually to the I/O units U1, U2, U3, . . . in the order of 1, 2, 3, . . . with distance from the numerical controller.

If the power is turned on for the first time after systems are constructed for the numerical controller 10 and the I/O units U1, U2, U3, . . . or after the systems are modified and reconstructed, therefore, the processes of FIGS. 2 and 3 are executed, and the controller 10 performs the process of Step 106, thereby obtaining system configuration information composed of the group ID, the I/O unit type and correspondence, and the number of I/O units. Then, a system designer loads this information into a nonvolatile memory of the numerical controller 10 so that the information is stored as initial system configuration information for system construction.

FIG. 4 shows system configuration information for the storage of relationships between the group IDs stored in the nonvolatile memory and the types of the I/O units U1, U2, U3, . . . designated by the group IDs. The system configuration information stored in the nonvolatile memory is used as "initial system configuration information" and represented by symbol Is. FIG. 4 shows the initial system configuration information Is of a system example in which five I/O units U1, U2, U3, U4 and U5 are serially connected to the numerical controller 10 shown in FIG. 1.

The power of the numerical controller 10 is turned on after the systems are constructed by the system designer or the systems are modified and reconstructed. When the initial system configuration information Is is already stored in the nonvolatile memory by doing this, the numerical controller 10 checks in a second or later initiation cycle to see if the system configuration information recognized when the power is turned on agrees with the initial system configuration information Is recorded in the nonvolatile memory. Thus, when the power of the numerical controller 10 is turned on, the processes shown in FIGS. 2 and 3 are executed, whereupon the controller 10 obtains system configuration information Ir. The obtained system configuration information Ir and the initial system configuration information Is recorded in the nonvolatile memory are compared. An alarm is output if these informations are not coincident. In this manner, the systems can be checked for failures and mistakes, such as a system failure or misconnection of the I/O units.

Let it be supposed, in constructing the systems, that the I/O unit U2 is erroneously connected to the I/O unit U4 without being connected to the I/O unit U3, as shown in FIG. 5, with the numerical controller 10 and the I/O units U1, U2, U3, . . . connected in the manner shown in FIG. 1 and with the initial system configuration information Is shown in FIG. 4 stored in the nonvolatile memory, for example. If the power of the numerical controller 10 is turned on in this state, the controller 10 obtains the system configuration information Ir, as shown in FIG. 6. Then, the initial system configuration information Is recorded in the nonvolatile memory and the system configuration information Ir are compared, as shown in FIG. 7. As a result of this comparison, the I/O unit types stored corresponding to the group IDs 3 and 4 are found to be inconsistent, so that an alarm is output. Thus, the disconnection of the I/O unit U3 can be detected before the system operation is started.

FIG. 8 is a flowchart showing an algorithm of a system check process executed when the power of the numerical controller 10 is turned on according to the first embodiment.

When the power of the numerical controller 10 is turned on, the group ID allocation process shown in FIG. 2 is performed so that the group IDs are attached individually to the I/O units U1, U2, U3, . . . , and the system configuration information Ir is obtained with the I/O unit types corresponding individually to the group IDs (Step 301).

The obtained system configuration information Ir and the stored initial system configuration information Is are compared (see FIG. 7) and checked to see if they agree with each other (Step 302). If there is any disagreement between the two (Step 303), the disagreement is displayed on a screen of a display unit of the numerical controller 10 (Step 304). In the example shown in FIG. 7, it is indicated that the I/O unit types for the group IDs 3 and 4 disagree and that there is no I/O unit for the group ID 5.

Thereupon, an operator concludes that the I/O unit U3 is not connected and connects the I/O unit U3 between the I/O units U2 and U4, thereby creating the system shown in FIG. 1. If the power of the numerical controller 10 is turned on, thereafter, no disagreement is detected in the check of Step 302, so that the numerical controller 10 is normally started to be operated (Step 305).

According to the first embodiment described above, the alarm is issued to notify a user of the wrongness of the system configuration when the system configuration information Ir obtained when the power of the numerical controller 10 is turned on is different from the initial system configuration information Is. In some cases, however, the system configuration may be changed lest the user should purposely select and connect I/O units to the numerical controller 10. It is to be desired, therefore, that the system be flexible enough to enable the user to optionally change the state of connection of the I/O units.

The following is a description of a second embodiment configured so that a user, operator, serviceman, etc. can optionally change the state of connection of the I/O units.

As shown in FIG. 1, the five I/O units are supposed to be connected to the numerical controller so that the initial system configuration information Is is obtained and stored in the manner shown in FIG. 4. Let it be supposed that the user has modified the system by connecting the I/O unit U2 to the I/O unit U4 without connecting the I/O unit U3, as shown in FIG. 5. In this case, the user or the like uses setting means, which is attached to the numerical controller 10, to set enable/disable states for the initial values of the group IDs that are set as the initial system configuration information Is in the controller 10. In this second embodiment, the enable/disable states are set for the initial values of the group IDs, as represented by setting information Ia in FIG. 9. The group ID 3 is set to be disabled, and the other group IDs are set to be enabled.

Based on this setting information, group ID correspondence information Ib indicative of correspondence between the group IDs of the initial system configuration information Is and the group IDs for execution according to enable/disable setting (successively allocated to the group IDs set to be enabled in the order of distance from the numerical controller 10) is obtained. Based on the group ID correspondence information Ib and the initial system configuration information Is, system-configuration checking information Ic for checking correspondence between the group IDs and the I/O unit types in the set system is created.

When the power of the numerical controller 10 is turned on, the processes shown in FIGS. 2 and 3 are first executed, the system-configuration checking information Ic is created, and it is determined based on this information Ic whether or not the system is an intended one without an error. More specifically, in FIG. 7, the system-configuration checking information Ic is used in place of the initial system configuration information Is and compared with the system configuration information Ir obtained in the processes shown in FIGS. 2 and 3 to see if the informations agree with each other.

However, addresses (addresses that store the first I/O signal of each I/O unit) for the I/O units U1, U2, U3, ..., which are provided in a signal memory of the numerical controller 10, are allocated to the configuration (group IDs) obtained at the time of system construction. If the user or the like changes the system configuration and sets the enable/disable state for the group IDs to reduce or increase the I/O units to be connected to the numerical controller 10, therefore, the addresses must be modified correspondingly.

The following is a description of allocation data with which the addresses are made to correspond to the I/O units (group IDs) and a method for changing the configuration.

Since the I/O signals input and output from the I/O units are processed according to a ladder program that is executed by the numerical controller 10, they should be allocated to unique addresses with respect to the numerical controller. The correspondence of the addresses to the I/O signals is set based on allocation data indicative of the correspondence between the group IDs and starting addresses (see FIG. 10b).

Since apparatuses that are connected to the I/O units U1, U2, U3, ... vary depending on the system, the allocation data must be freely modified by the system designer. On the other hand, the allocation data are associated with the system configuration and are proper to the system, so that it is desirable that they cannot be easily modified by the user, operator, serviceman, etc.

In the system of this embodiment, the group ID of each I/O unit used is automatically set in accordance with an actual connection sequence. Therefore, if the five I/O units U1, U2, U3, U4 and U5 are connected to the numerical controller 10, as shown in FIG. 10a, for example, addresses are automatically allocated to the individual I/O units (group IDs), as shown in FIG. 10b. If the I/O unit U3 is removed from this system to create the system shown in FIG. 11a, the numerical controller 10 recognizes it in the form shown in FIG. 11b, so that the addresses are not conformable to the actual I/O units. The addresses for the I/O units U1 and U2 never vary and have no problems. However, the addresses fail to correspond to or be conformable to the I/O units U4 and U5. Specifically, the addresses for the I/O units U4 and U5 are set to "60" and "10", respectively. Since the I/O unit U3 is not connected so that the automatically allocated group IDs are changed from 4 to 3 and from 5 to 4, the addresses for the I/O units U4 and U5 are set to "30" and "60", respectively. Thus, the addresses set for the I/O units are erroneous.

Figures 12A, 12B, 13A, 13B:
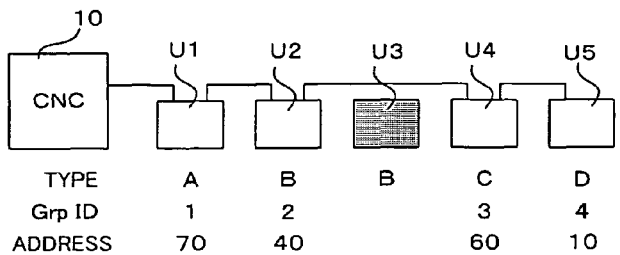
FIGS. 12a and 12b are diagrams illustrating a state after the I/O units and the addresses are adjusted to one another.

As shown in FIG. 12b, therefore, allocation of the addresses for the I/O units should be changed so as to correspond to the modified system (addresses for the I/O units U4 and U5 should be set to "60" and "10", respectively).

Even in the case where the user, serviceman, or the like temporarily changes the system configuration at the time of adjustment, for example, all the allocation data must be modified as the system is changed. As mentioned before, however, the allocation data are associated with the system configuration. Preferably, therefore, the allocation data should be prevented from being altered by any other person than one who fully comprehends the entire system lest any trouble be caused by setting errors.

If the system configuration is changed, the correspondence between the I/O units and the addresses is corrected in accordance with the group ID correspondence information Ib that is obtained based on the enable/disable setting information Ia for the set group IDs (already described with reference to FIG. 9) without modifying the allocation data.

FIG. 13 is a diagram illustrating an example of modification based on a correspondence table showing the correspondence between the I/O units and the addresses that accompanies the system change. Initial address-correspondence information IAs is stored with the correspondence between the addresses, group IDs, and I/O units set at the time of system construction, and this data is unchangeable. On the other hand, correspondence information IAr indicative of the correspondence between the I/O units and the addresses after the system configuration change is created according to the group ID correspondence information Ib that is obtained based on the enable/disable setting information Ia for the set group IDs (or based on the correspondence between the initial values of the group IDs obtained by the enable/disable setting and the group IDs set as the initial system configuration information Is).

Even if the system configuration is thus changed so that the relationships between the group IDs and the I/O units are changed, the addresses for the group IDs can be automatically changed and allocated in accordance with the group ID correspondence information Ib obtained based on the enable/disable setting information Ia for the group IDs. Thus, the addresses for the I/O units can be automatically adjusted lest they be changed.

Figure 14:
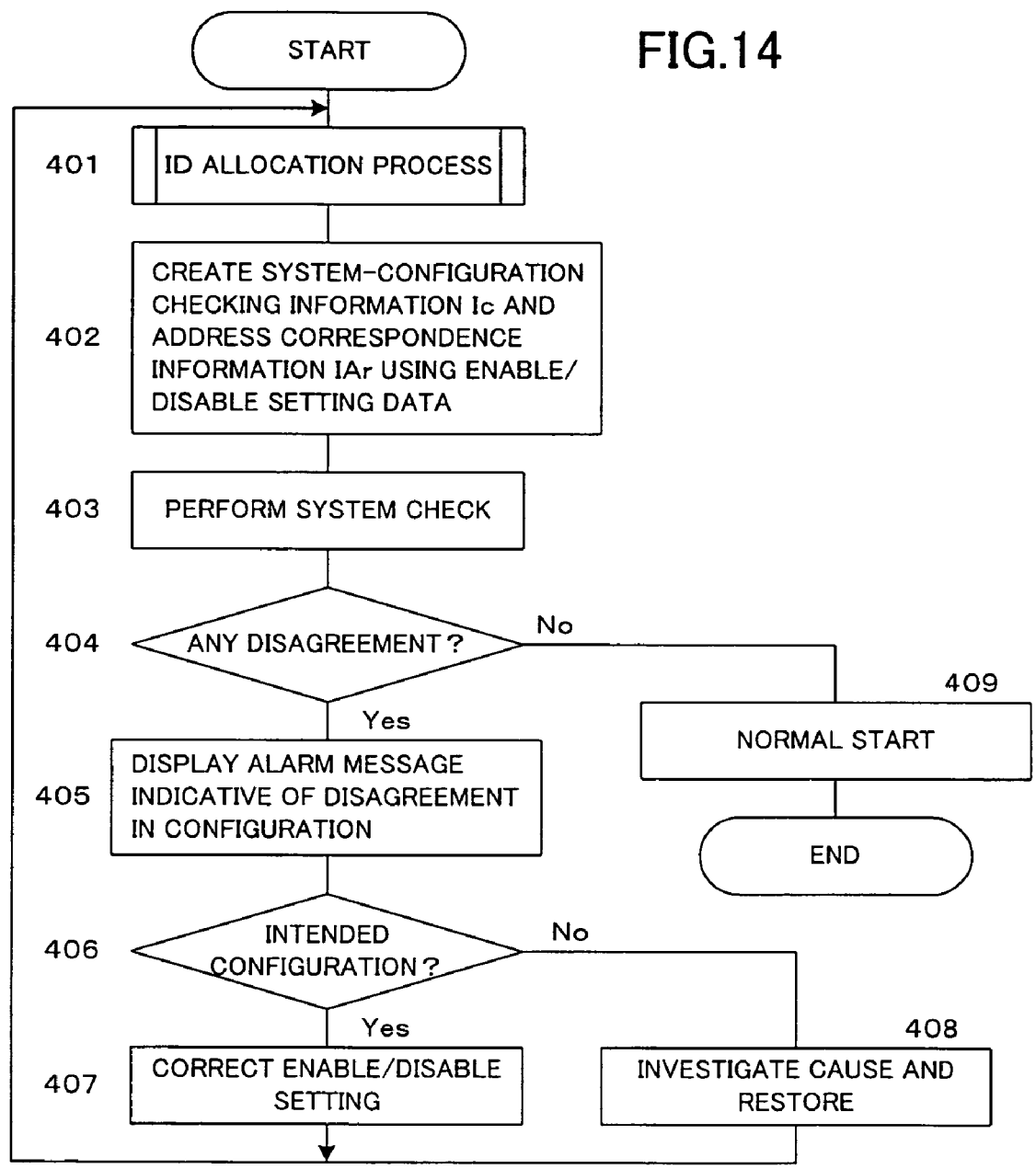
FIG. 14 is a flowchart showing an algorithm of a system check process according to the second embodiment.

FIG. 14 is a flowchart showing an algorithm of a system check process executed when the power of the numerical controller 10 is turned on according to the second embodiment.

When the power of the numerical controller 10 is turned on, the group ID allocation process shown in FIG. 2 is performed so that the group IDs are attached individually to the I/O units, and the system configuration information Ir is obtained with the I/O unit types corresponding individually to the group IDs (Step 401).

Then, the group ID correspondence information Ib is obtained from the enable/disable setting information Ia with respect to the initial values of the group IDs set at the time of system construction, and the system-configuration checking information Ic is created based on the group ID correspondence information Ib and the initial system configuration information Is (see FIG. 9). Further, the address-correspondence information IAr is created based on the initial address-correspondence information IAs and the group ID correspondence information Ib (Step 402).

Then, the system configuration information Ir obtained in Step 401 and the system-configuration checking information Ic obtained in Step 402 are compared and checked to determine whether or not they agree with each other (Step 403). If there is any disagreement between the two (Step 404), the disagreement (in the relationships between the group IDs and the I/O unit types, inconsistency of the number of I/O units, etc.) is displayed as an alarm message on the screen of the display unit of the numerical controller 10 (Step 405).

With reference to this display, the operator determines whether or not the change of the system configuration is an intended one (Step 406). If an alarm is issued with the system configuration regarded as intended, then it indicates that the enable/disable setting for the initial group IDs is erroneous. Therefore, the enable/disable setting for the initial group IDs is corrected (Step 407), whereupon the program returns to Step 401. If it is concluded that the system configuration is not an intended one, cause investigation is performed. Specifically, the enable/disable setting for the initial group IDs enables the construction of an intended system. If an actual system configuration is not the intended one, however, there is a possibility of wrong wire connection, misconnection, or the like. Accordingly, the cause of the alarm is investigated for restoration (Step 408), whereupon the program returns to Step 401 and the aforementioned processes are performed thereafter. If no disagreement is detected in Step 404, the numerical controller 10 is normally started to be operated (Step 409). In the operation, the I/O signals of the I/O units are stored in predetermined addresses based on the addresses and the group IDs given by the address-correspondence information IAr.

According to the second embodiment, as described above, the group IDs can be allocated individually to the I/O units U1, U2, U3, . . . and the addresses can be automatically-allocated to the group IDs (I/O units) by only performing the enable/disable setting for the initial group IDs. At the time of system construction, therefore, the system designer combines the I/O unit types to create the initial system configuration information Is and the initial address-correspondence information IAs for the maximum number of I/O units to enable attachment to the numerical controller 10 and set the informations in advance in the controller 10. When the connection of the I/O units is changed, the user, operator, serviceman, etc. are expected only to perform enable/disable setting for the initial group IDs so that the I/O units, group IDs, and addresses in an actual system can be adjusted automatically.

In the embodiment described above, moreover, the I/O units of different types are supposed to be connected to the numerical controller 10. If only the I/O units of the same type are connected, however, the I/O unit type need not be stored provided that the I/O units can be connected and disconnected (e.g., in the case where I/O units that are connected to a temperature sensor is connected to and disconnected from the numerical controller). In this case, it is necessary only that the group ID correspondence information Ib be prepared based on the enable/disable setting for the initial group IDs (see FIG. 9) and the address-correspondence information IAr be created based on the group ID correspondence information Ib and the initial address-correspondence information IAs (see FIG. 13).

If the checking process is not performed so that no alarm is issued, in the second embodiment described above, moreover, it is necessary only that the address-correspondence information IAr be created in Step 402 of FIG. 14.

What is claimed is:

1. A numerical controller having a plurality of external-signal input/output units connected thereto, comprising:
    group ID allocating means that automatically allocates group IDs to the external-signal input/output units each time when the numerical controller is started;
    initial system-configuration information storage means storing initial system-configuration information indicative of correspondence between the group IDs and the external-signal input/output units and;
    checking means that checks whether or not correspondence between group IDs automatically allocated by said group ID allocating means when the numerical controller is started and the external-signal input/output units agrees with the correspondence of the initial system-configuration information stored in said initial system-configuration information storage means; and
    means that issues an alarm when a result of the check by said checking means is negative.

2. A numerical controller according to claim 1, further comprising reading means that reads types of the external-signal input/output units respectively therefrom each time when the numerical controller is started,
    wherein said initial system-configuration information storage means stores correspondence between the group IDs and types of the external-signal input/output units, and said checking means checks whether or not correspondence between group IDs automatically allocated by said group ID allocating means and the types of the external-signal input/output units read by said reading means when the numerical controller is started agrees with the correspondence stored by said initial system-configuration information storage means.

3. A numerical controller having a plurality of external-signal input/output units connected thereto and a signal memory for input/output signals of the external-signal input/output units, said numerical controller comprising:
    group ID allocating means that automatically allocates group IDs to the external-signal input/output units each time when the numerical controller is started;
    initial system-configuration information storage means that stores initial system-configuration information indicative of correspondence between the group IDs and the external-signal input/output units;
    initial address-correspondence information storage means that stores correspondence between the group IDs of the initial system-configuration information and addresses of the signal memory;
    enable/disable setting means that sets enable/disable states for the group IDs of the initial system-configuration information;
    means that creates group ID correspondence information indicative of correspondence between the group IDs of the initial system-configuration information and group IDs modified according to the enable/disable states set by said enable/disable setting means; and
    means that obtains modified address-correspondence information indicative of correspondence between the modified group IDs and addresses of the signal memory based on the initial address-correspondence information and the group ID correspondence information,
    wherein the input/output signals of the external-signal input/output units are controlled according to the modified address-correspondence information.

4. A numerical controller according to claim 3, further comprising means that obtains system-configuration checking information based on the group ID correspondence information and the correspondence between the group IDs and the external-signal input/output units of the initial system-configuration information, checking means that checks whether or not the correspondence between group IDs automatically allocated by said group ID allocation means when the numerical controller is started and the external-signal input/output units agrees with the system-configuration checking information, and means that issues an alarm when a result of the check by said checking means is negative.

5. A numerical controller according to claim 4, further comprising reading means that reads types of the external-signal input/output units respectively therefrom each time when the numerical controller is started, wherein said initial system-configuration information storage means stores correspondence between the group IDs and types of the external-signal input/output units, and said checking means checks whether or not correspondence between group IDs automatically allocated by said group ID allocation means when the numerical controller is started and the types of the external-signal input/output units read by said reading means agrees with the system-configuration checking information obtained based on the group ID correspondence information and the correspondence between the group IDs and types of the external-signal input/output units stored by said initial system-configuration information storage means.

* * * * *